US012314498B2

(12) United States Patent
Suzuki et al.

(10) Patent No.: US 12,314,498 B2
(45) Date of Patent: May 27, 2025

(54) INPUT APPARATUS (71) Applicant: Alps Alpine Co., Ltd., Tokyo (JP)

(72) Inventors: Hajime Suzuki, Miyagi (JP); Kunio Sato, Miyagi (JP); Shinichi Sagawai, Miyagi (JP); I Ka, Miyagi (JP)

(73) Assignee: Alps Alpine Co., Ltd. (JP)

( * ) Notice: Subject to any disclaimer, the term of this patent is extended or adjusted under 35 U.S.C. 154(b) by 61 days.

(21) Appl. No.: 18/152,402

(22) Filed: Jan. 10, 2023

(65) Prior Publication Data

US 2023/0161414 A1 May 25, 2023

Related U.S. Application Data (63) Continuation of application No. PCT/JP2021/019352, filed on May 21, 2021.

(30) Foreign Application Priority Data

Aug. 31, 2020 (JP) .................. 2020-146037

(51) Int. Cl.
*G06F 3/041* (2006.01)
*B06B 1/02* (2006.01)
*G06F 3/01* (2006.01)

(52) U.S. Cl.
CPC ............ *G06F 3/041* (2013.01); *B06B 1/0253* (2013.01); *G06F 3/016* (2013.01); *B06B 2201/55* (2013.01)

(58) Field of Classification Search
CPC ....... G06F 3/041; G06F 3/016; B06B 1/0253; B06B 2201/55
USPC ...................................................... 340/407.1
See application file for complete search history.

(56) References Cited

U.S. PATENT DOCUMENTS

| 7,525,415 | B2 | 4/2009 | Yatsu et al. |
| 9,369,127 | B1 | 6/2016 | Nickson et al. |
| 10,295,973 | B1 * | 5/2019 | Mookerjee ......... G05B 13/0205 |
| 10,504,342 | B1 * | 12/2019 | Khoshkava ............. G08B 6/00 |

(Continued)

FOREIGN PATENT DOCUMENTS

| JP | 2004-192412 A | 7/2004 |
| JP | 2006-079136 A | 3/2006 |

(Continued)

OTHER PUBLICATIONS

International Search Report for corresponding International Application No. PCT/JP2021/019352 dated May 21, 2021, with English translation (5 Pages).

*Primary Examiner* — Kerri L McNally
*Assistant Examiner* — Thang D Tran
(74) *Attorney, Agent, or Firm* — Harness, Dickey & Pierce, P.L.C.

(57) ABSTRACT

An input apparatus includes an operating unit on which an input operation is performed by an operator, a detecting unit configured to detect the input operation performed on the operating unit, an actuator configured to impart vibration to the operating unit, and a control unit configured to supply a drive signal to the actuator according to a result of detection performed by the detecting unit. The control unit supplies, as the drive signal, a single pulse signal including a triangular wave or a sine wave and having a signal waveform in which a rising interval and a falling interval are asymmetric about a peak position to the actuator.

8 Claims, 6 Drawing Sheets (56) References Cited

U.S. PATENT DOCUMENTS

| | | | | |
|---|---|---|---|---|
| 2003/0012042 A1* | 1/2003 | Rew | G05D 19/02 | 363/165 |
| 2004/0050999 A1* | 3/2004 | Hill | G05D 19/02 | 244/17.27 |
| 2004/0164971 A1* | 8/2004 | Hayward | G06F 3/03547 | 345/179 |
| 2006/0241864 A1* | 10/2006 | Rosenberg | G06F 3/016 | 701/469 |
| 2008/0141787 A1* | 6/2008 | Friedrichs | G01F 1/8436 | 73/861.354 |
| 2009/0072662 A1* | 3/2009 | Sadler | G06F 1/3203 | 345/173 |
| 2009/0151433 A1* | 6/2009 | Gao | B24B 1/04 | 73/104 |
| 2010/0309142 A1* | 12/2010 | Cruz-Hernandez | G06F 3/041 | 345/173 |
| 2011/0163861 A1* | 7/2011 | Uetake | G06F 3/016 | 340/407.2 |
| 2011/0248916 A1* | 10/2011 | Griffin | G06F 3/0416 | 345/157 |
| 2011/0248931 A1* | 10/2011 | Shenfield | G06F 3/0488 | 345/173 |
| 2012/0025742 A1* | 2/2012 | Masahiko | H02K 33/16 | 318/114 |
| 2012/0040722 A1* | 2/2012 | Dehmoubed | G06F 3/048 | 345/173 |
| 2012/0060595 A1* | 3/2012 | Guwang | G01L 23/10 | 73/114.18 |
| 2012/0154316 A1* | 6/2012 | Kono | G06F 3/0416 | 345/173 |
| 2012/0229401 A1* | 9/2012 | Birnbaum | G06F 3/016 | 345/173 |
| 2012/0229424 A1* | 9/2012 | Behles | G06F 3/016 | 345/173 |
| 2012/0249459 A1* | 10/2012 | Sashida | G06F 3/041 | 345/173 |
| 2012/0303243 A1* | 11/2012 | Momose | F02D 41/1402 | 701/102 |
| 2014/0139328 A1* | 5/2014 | Zellers | G06F 3/041 | 340/407.2 |
| 2014/0139329 A1* | 5/2014 | Ramstein | G08B 6/00 | 340/407.2 |
| 2014/0139436 A1* | 5/2014 | Ramstein | G06F 3/016 | 310/331 |
| 2014/0191973 A1* | 7/2014 | Zellers | G06F 1/1632 | 340/407.2 |
| 2014/0334193 A1* | 11/2014 | Meyer | H02M 7/537 | 363/21.01 |
| 2015/0316762 A1* | 11/2015 | Hambeck | G02B 26/0833 | 359/199.1 |
| 2016/0239089 A1* | 8/2016 | Taninaka | B06B 1/06 | |
| 2017/0170786 A1* | 6/2017 | Imanishi | H03B 5/364 | |
| 2017/0329405 A1* | 11/2017 | Dabic | G06F 3/0488 | |
| 2017/0329406 A1* | 11/2017 | Dabic | G06F 3/0421 | |
| 2017/0329953 A1* | 11/2017 | Defazio | G06F 3/016 | |
| 2018/0059849 A1* | 3/2018 | Peshkin | G06F 3/045 | |
| 2018/0181202 A1* | 6/2018 | Khoshkava | G06F 3/04144 | |
| 2018/0321748 A1* | 11/2018 | Rao | G06F 3/016 | |
| 2019/0226552 A1* | 7/2019 | Oi | F16H 45/02 | |
| 2020/0386631 A1* | 12/2020 | Wang | G06F 3/016 | |

FOREIGN PATENT DOCUMENTS

| | | |
|---|---|---|
| JP | 2008-123429 A | 5/2008 |
| JP | 2013-513865 A | 4/2013 |
| JP | 2013-144273 A | 7/2013 |
| JP | 2015-011376 A | 1/2015 |
| JP | 2020-062647 A | 4/2020 |
| WO | 2011-071837 A2 | 6/2011 |

* cited by examiner

INPUT APPARATUS

CLAIM OF PRIORITY

This application is a Continuation of International Application No. PCT/JP2021/019352 filed on May 21, 2021, which claims benefit of Japanese Patent Application No. 2020-146037 filed on Aug. 31, 2020. The entire contents of each application noted above are hereby incorporated by reference.

BACKGROUND OF THE INVENTION

1. Field of the Invention

The present invention relates to an input apparatus.

2. Description of the Related Art

Japanese Unexamined Patent Application Publication No. 2008-123429 discloses a technique for generating a sense of touch at a user's finger that is in contact with a touch panel of a movable panel unit by vibrating the movable panel unit with an actuator. Japanese Unexamined Patent Application Publication No. 2008-123429 also discloses a configuration for forming a drive signal for the actuator having a waveform whose magnitude changes gradually such that the high-frequency component is reduced at both or one of the beginning and end of the drive signal.

Japanese Unexamined Patent Application Publication No. 2006-79136 discloses a technique for presenting a sense of touch by vibrating a panel using a magnetic force. Japanese Unexamined Patent Application Publication No. 2006-79136 also discloses a technique for vibrating a panel so that vibration of the panel has a gradually rising waveform of a sign wave squared.

However, although the known technique can reduce the effect of sound generated when the actuator is driven, the known technique cannot appropriately adjust, using a drive signal, the characteristics of a pseudo-operation sound and a pseudo tactile feeling to be generated by the actuator in response to an input operation of a zero travel or a minute travel (hereinafter referred to as "zero travel or the like") on the operation panel.

For example, even though a pseudo low-frequency tactile feeling and a pseudo low-frequency click operation sound of a mechanical switch are intended to be generated using an actuator in response to an input operation of a zero travel or the like on a touchpad, an unintended high-frequency output sound is generated, which may give the operator a noticeable difference.

Furthermore, for example, even though a pseudo low-frequency tactile feeling and a pseudo high-frequency high-output-level click operation sound of a mechanical switch are to be generated using an actuator in response to an input operation of a zero travel or the like on a touchpad, the output level of the clock operation sound is insufficient, which may give the operator a noticeable difference.

Furthermore, for example, even though a pseudo stroke operation feeling of a mechanical switch is to be generated using an actuator in response to an input operation of a zero travel or the like on a touchpad, the actual amount of displacement on the touchpad is significantly small, which may give the operator no sufficient stroke operation feeling.

SUMMARY OF THE INVENTION

An input apparatus according to an embodiment includes an operating unit on which an input operation is performed by an operator, a detecting unit configured to detect the input operation performed on the operating unit, an actuator configured to impart vibration to the operating unit, and a control unit configured to supply a drive signal to the actuator according to a result of detection performed by the detecting unit, wherein the control unit supplies, as the drive signal, a single pulse signal including a triangular wave or a sine wave and having a signal waveform in which a rising interval and a falling interval are asymmetric about a peak position to the actuator.

According to an embodiment, the characteristics of the pseudo-operation sound and tactile feeling that simulate a mechanical switch to be generated by the actuator in response to an input operation can be appropriately adjusted using a drive signal.

DESCRIPTION OF THE PREFERRED EMBODIMENTS

An embodiment of the present invention will be described hereinbelow with reference to the drawings.

Configuration of Input Apparatus 100

Figure 1:
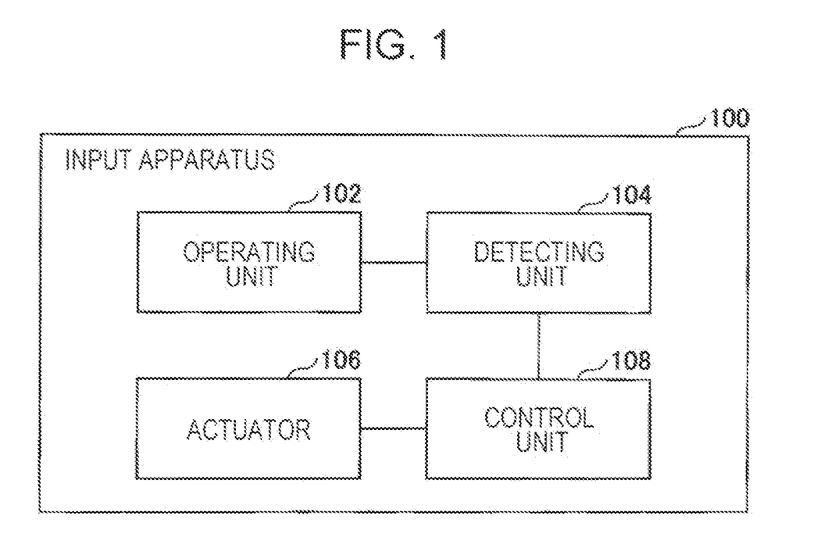
FIG. 1 is a block diagram illustrating the configuration of an input apparatus according to an embodiment.

FIG. 1 is a block diagram illustrating the configuration of an input apparatus 100 according to an embodiment. The input apparatus 100 shown in FIG. 1 is used as an input apparatus for performing an input operation on the device to be operated (for example, a controller for a game machine and an input apparatus for a vehicle). The input apparatus 100 is capable of presenting a pseudo-operation sound and a pseudo-operation feeling to an operator by generating vibration in response to an input operation performed by the operator.

As shown in FIG. 1, the input apparatus 100 includes an operating unit 102, a detecting unit 104, an actuator 106, and a control unit 108.

The operating unit 102 receives an input operation performed by an operator. An example of the operating unit 102 is a touchpad including a hard planar operating surface. The operating unit 102 can receive an input operation that rarely deforms the operating-surface in the direction of operation, that is, an input operation of a zero travel or the like.

The detecting unit 104 detects an input operation on the operating unit 102. For example, the detecting unit 104 detects the position of an input operation of a zero travel or the like performed on the operating unit 102 and a pressing force on the basis of a detection signal output from various sensors (for example, an electrostatic sensor and a pressure sensor) installed in the operating unit 102.

The actuator 106 vibrates the operating unit 102. Specifically, the actuator 106 generates vibration by receiving a drive signal from the control unit 108. The vibration generated by the actuator 106 is transmitted to the operating unit 102 to vibrate the operating unit 102, thereby presenting a tactile feeling to the operator who is operating the operating unit 102. Examples of the actuator 106 include a piezoelectric element and a polymeric actuator.

The control unit 108 drives the actuator 106 to generate vibration by supplying a drive signal to the actuator 106 according to the result of detection performed by the detecting unit 104. For example, when an input operation on the operating unit 102 is detected by the detecting unit 104, the control unit 108 supplies a drive signal to the actuator 106 to drive the actuator 106, thereby generating vibration. This allows the actuator 106 to generate a pseudo-operation sound according to the input operation and present the sound to the user and to present a pseudo tactile feeling according to the input operation to the operator via the operating unit 102.

The control unit 108 can control the characteristics of the operation sound and the tactile feeling presented to the user by controlling the waveform of the drive signal supplied to the actuator 106. For example, the control unit 108 can control the frequency of the operation sound presented to the user by controlling the waveform of the drive signal. For example, the control unit 108 can also control an operation feeling that simulates a tactile feeling, which is generated when a mechanical switch is pressed and is presented to the user, and the stroke amount of the mechanical switch by controlling the waveform of the drive signal.

In particular, the control unit 108 supplies, as the drive signal, a single pulse signal having a triangular wave or a sine wave and having a signal waveform in which the rising interval and the falling interval are asymmetric about a peak position to the actuator 106. This allows the input apparatus 100 according to an embodiment to appropriately adjust the characteristics of the pseudo-operation sound and tactile feeling to be generated by the actuator 106 in response to an input operation.

Example of Drive Signal and Vibration Waveform in Related Art

Figure 2:
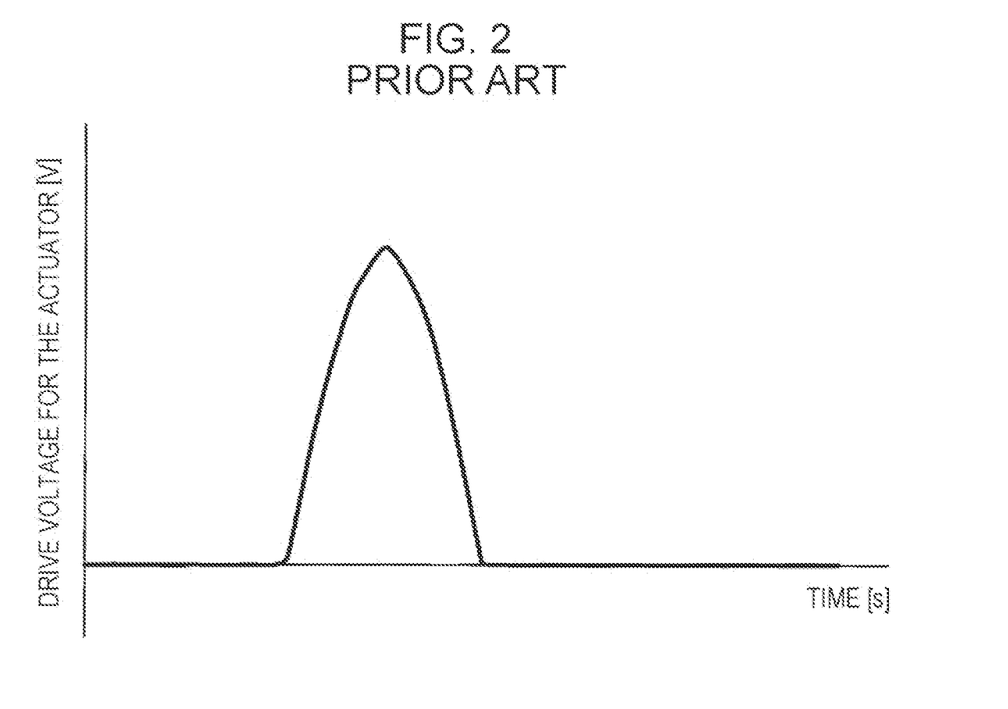
FIG. 2 is a diagram illustrating an example of the drive signal of a known actuator.
Figure 3:
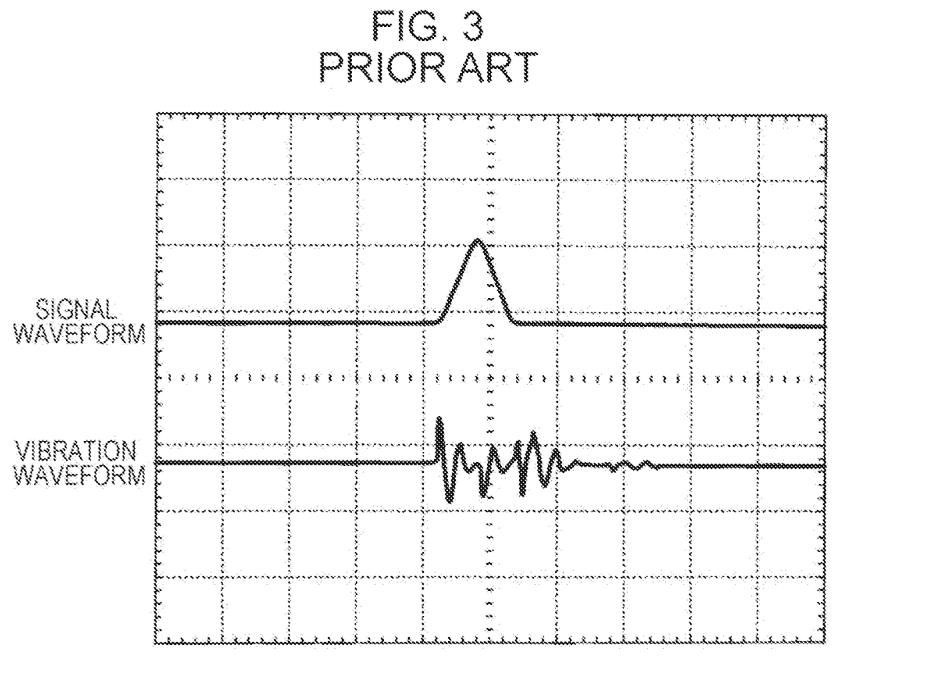
FIG. 3 is a diagram illustrating an example of the waveform of the drive signal shown in FIG. 2 and the vibration waveform of an operating unit responsive to the drive signal.

FIG. 2 is a diagram illustrating an example of a drive signal for a known actuator. FIG. 3 is a diagram illustrating an example of the waveform of the drive signal shown in FIG. 2 and the vibration waveform of the operating unit in response to the drive signal. As shown in FIG. 2, the known drive signal has a signal waveform in which the rising interval and the falling interval are symmetric with each other. The driving of the actuator necessary for presenting a tactile feeling generated when a metal switch is pressed is performed by inputting in the rising interval and the falling interval. As shown in the vibration waveform of FIG. 3, when the actuator is driven using the drive signal shown in FIG. 2, relatively large residual vibration that depends on the natural vibration frequency of the operating unit is generated also after the end of the falling interval of the waveform of the drive signal.

This residual vibration causes an operation sound with an unintended high frequency and high output level.

Example of Drive Signal and Vibration Waveform According to Embodiment (Example 1)

Figure 4:
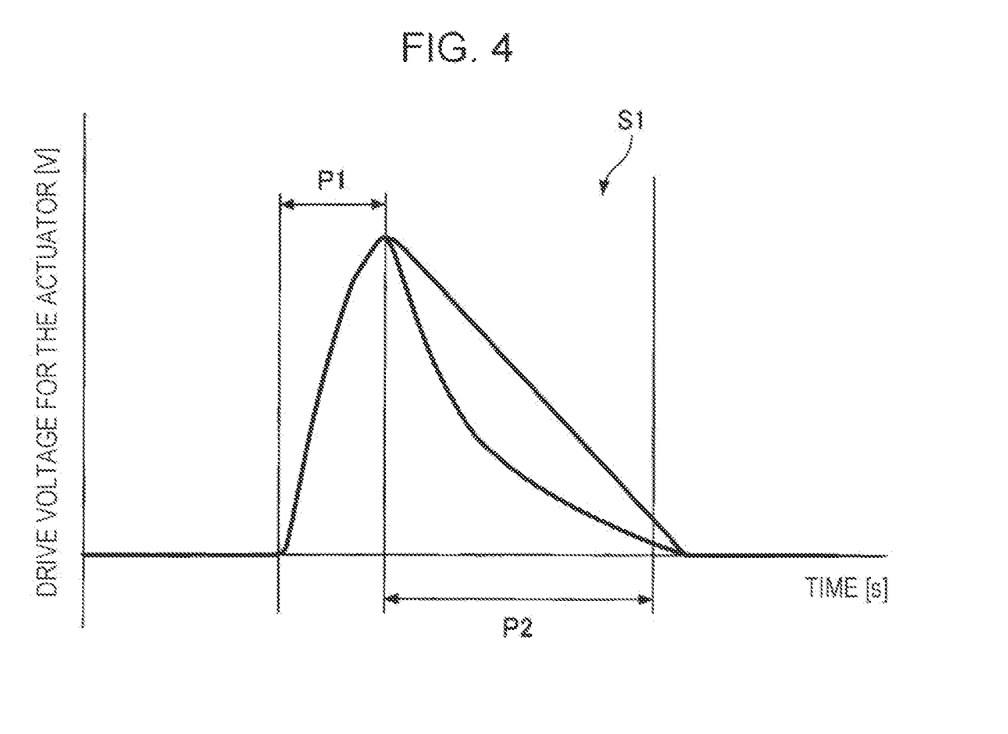
FIG. 4 is a diagram illustrating the waveform of a drive signal according to an embodiment.

FIG. 4 is a diagram illustrating the waveform of a drive signal S1 according to an embodiment. The drive signal S1 shown in FIG. 4 is Example 1 of the drive signal supplied from the control unit 108 to the actuator 106 in the input apparatus 100 according to an embodiment. As shown in FIG. 4, the drive signal S1 is a single pulse signal with a triangular wave having a signal waveform in which a rising interval P1 and a falling interval P2 are asymmetric about the peal position.

In particular, the waveform of the drive signal S1 was such that the falling interval P2 was longer than the rising interval P1. In other words, the voltage in the rising interval P1 of the waveform of the drive signal S1 rose steeply, whereas the voltage in the falling interval P2 dropped gradually. In particular, the waveform of the drive signal S1 was 20% or more longer in the falling interval P2 than in the rising interval P1. The waveform of the drive signal S1 may be such that the voltage drop in the falling interval P2 may be linear or quadratic, as shown in FIG. 4. The voltage rise in the rising interval P1 may also be linear or quadratic.

Figure 5:
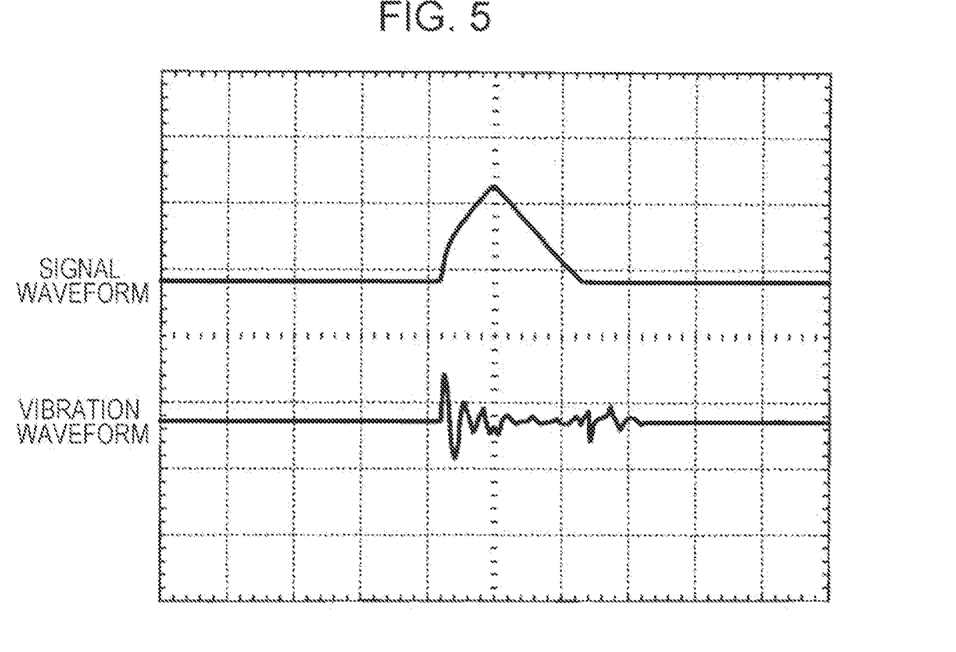
FIG. 5 is a diagram illustrating an example of the vibration waveform of an operating unit responsive to the drive signal shown in FIG. 4.

FIG. 5 is a chart showing an example the vibration waveform of the operating unit 102 in response to the drive signal S1 shown in FIG. 4. FIG. 5 illustrates the vibration waveform of the operating unit 102 when the actuator 106 is driven in response to the drive signal S1 shown in FIG. 4 together with the waveform of the drive signal S1. As shown in FIG. 5, when the actuator 106 was driven in response to the drive signal S1 shown in FIG. 4, generation of vibration caused by the actuator 106 was reduced in the falling interval P2 of the waveform of the drive signal S1. As a result, the operation sound generated by the actuator 106 had a lower frequency component.

In particular, the input apparatus 100 according to an embodiment could increase the difference between the drive frequency and the natural frequency of the operating unit 102 to reduce high-frequency vibration because of the gradual falling interval P2 of the drive signal S1. This allowed the actuator 106 of the input apparatus 100 according to an embodiment to generate an operation sound with a lower frequency component. A simulation showed that the input apparatus 100 according to an embodiment can increase the effect of reducing high-frequency vibration because of the falling interval P2 of the drive signal S1 20% or more longer than the rising interval P1.

Example of Drive Signal According to Embodiment (Example 2)

Figure 6:
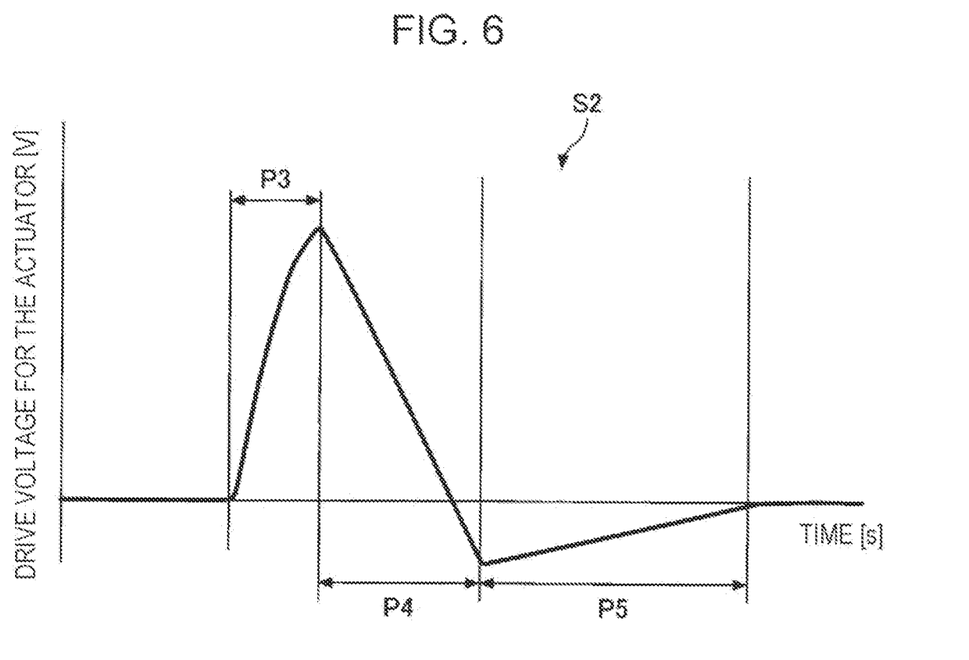
FIG. 6 is a diagram illustrating the waveform of a drive signal according to an embodiment.

FIG. 6 is a diagram illustrating the waveform of a drive signal S2 according to an embodiment. The drive signal S2 shown in FIG. 6 is Example 2 of the drive signal supplied from the control unit 108 to the actuator 106 in the input apparatus 100 according to an embodiment. The drive signal S2 shown in FIG. 6 is a single pulse signal with a triangular wave having a signal waveform in which a rising interval P3 and a falling interval P4 are asymmetric about the peal position.

The waveform of the drive signal S2 is such that the falling interval P4 was longer than the rising interval P3, as is the waveform of the drive signal S1 shown in FIG. 4. Driving necessary for presenting a tactile feeling generated when a metal switch is pressed is an input during the period from the rising interval P3 to the falling interval P4. Vibration generated by the voltage input thereafter until the voltage is returned to an unapplied level is only noise to vibration for presenting a desired tactile feeling and therefore needs to be reduced as much as possible. However, the waveform of the drive signal S2 reached the peak of the negative voltage in the falling interval P4 to provide a sufficient drive voltage range. For this reason, the waveform of the drive signal S2 further has a return interval P5 in which the drive voltage returns from the peak of the negative voltage to the initial voltage (0 V). The waveform of the drive signal S2 is preferably such that the voltage rise is gradual in the return interval P5. To realize the gradual voltage rise, the voltage fluctuation rate in the return interval P5 is preferably lower than that in the falling interval P4. In other words, the return interval P5 preferably has a sufficient length. The "sufficient length" is larger than or equal to the length of time until residual vibration that may occur at the end of the falling interval P4 (that is, when the drive voltage is at the peak of the negative voltage) is concluded and equal to the length of time until the voltage returns to the initial voltage (0 V) before the next vibration occurs. For example, setting the return interval P5 longer than the falling interval P4 allows the return interval P5 to have "a length until residual vibration that may occur around the end of the falling interval P4 is concluded". This is because the period of the residual vibration that may occur around the end of the falling interval P4 is generally shorter than the falling interval P4. Setting the return interval P5 sufficiently long allows reducing the amount of residual vibration that may occur when the drive voltage returns from the peak of the negative voltage to the initial voltage (0 V) (that is, at the end of the return interval P5). The drive signal S2 can displace a piezoelectric element in the convex direction (at positive voltage) and the concave direction (at negative voltage) and is therefore preferably used in the case where the actuator 106 is a piezoelectric element, and the drive circuit has no sufficient drive capability.

Example of Drive Signal and Vibration Waveform According to Embodiment (Example 3)

Figure 7:
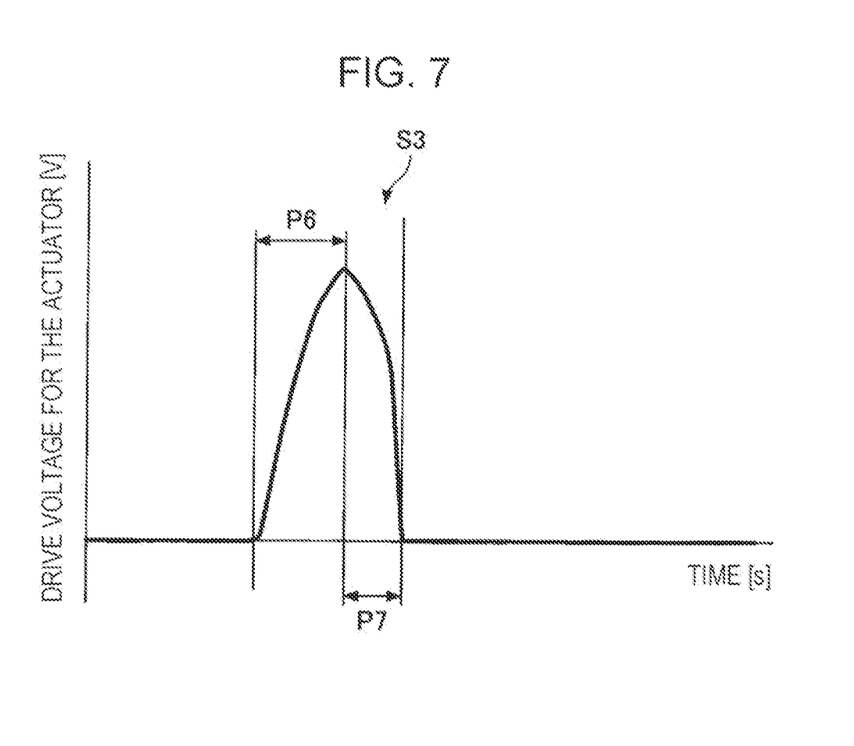
FIG. 7 is a diagram illustrating the waveform of a drive signal according to an embodiment.

FIG. 7 is a diagram illustrating the waveform of a drive signal S3 according to an embodiment. The drive signal S3 shown in FIG. 7 is Example 3 of the drive signal supplied from the control unit 108 to the actuator 106 in the input apparatus 100 according to an embodiment. As shown in FIG. 7, the drive signal S3 is a single pulse signal with a triangular wave having a signal waveform in which a rising interval P6 and a falling interval P7 are asymmetric about the peal position.

In particular, the waveform of the drive signal S3 was such that the falling interval P7 was shorter than the rising interval P6. In other words, the voltage in the rising interval P6 of the waveform of the drive signal S3 rose steeply, whereas the voltage in the falling interval P7 dropped more steeply.

Figure 8:
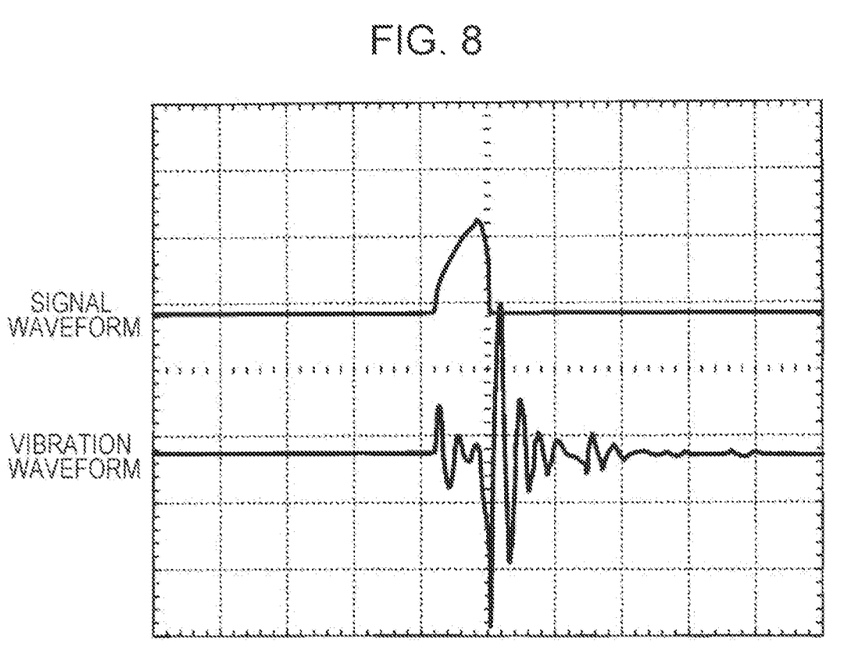
FIG. 8 is a diagram illustrating an example of the vibration waveform of an operating unit responsive to the drive signal shown in FIG. 7.

FIG. 8 is a chart showing an example the vibration waveform of the operating unit 102 in response to the drive signal S3 shown in FIG. 7. FIG. 8 illustrates the vibration waveform of the operating unit 102 when the actuator 106 is driven in response to the drive signal S3 shown in FIG. 7 together with the waveform of the drive signal S3. As shown in FIG. 8, when the actuator 106 was driven in response to the drive signal S3 shown in FIG. 7, vibration that depends on the natural vibration frequency of the operating unit 102 was amplified in the falling interval of the waveform of the drive signal S3. As a result, the actuator 106 generated a high output level sound because vibration with a high frequency component that depends on the natural vibration frequency of the operating unit 102 was amplified. The natural vibration frequency of the operating unit 102 is preferably 1 kHz or less in the viewpoint of mechanistic possibility Example of Drive Signal and Vibration Waveform According to Embodiment (Example 4)

Figure 9:
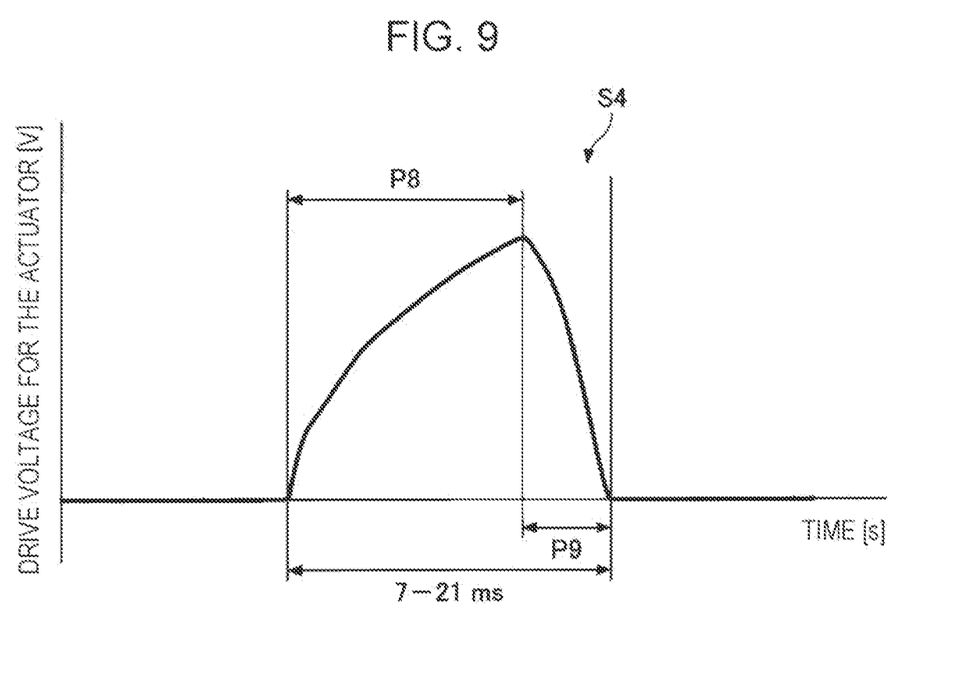
FIG. 9 is a diagram illustrating the waveform of a drive signal according to an embodiment.

FIG. 9 is a diagram illustrating the waveform of a drive signal S4 according to an embodiment. The drive signal S4 shown in FIG. 9 is Example 4 of the drive signal supplied from the control unit 108 to the actuator 106 in the input apparatus 100 according to an embodiment. As shown in FIG. 9, the drive signal S4 is a single pulse signal with a triangular wave having a signal waveform in which a rising interval P8 and a falling interval P9 are asymmetric about the peal position.

In particular, the waveform of the drive signal S4 was such that the falling interval P9 was shorter than the rising interval P8. Specifically, the voltage in the rising interval P8 of the waveform of the drive signal S4 changed so as to rise steeply and then gradually, whereas the voltage in the falling interval P9 drops steeply throughout. In the embodiment, the period of the waveform of the drive signal S4 (from the start of the rising interval P8 to the end of the falling interval P9) was set at 7 to 21 ms.

Figure 10:
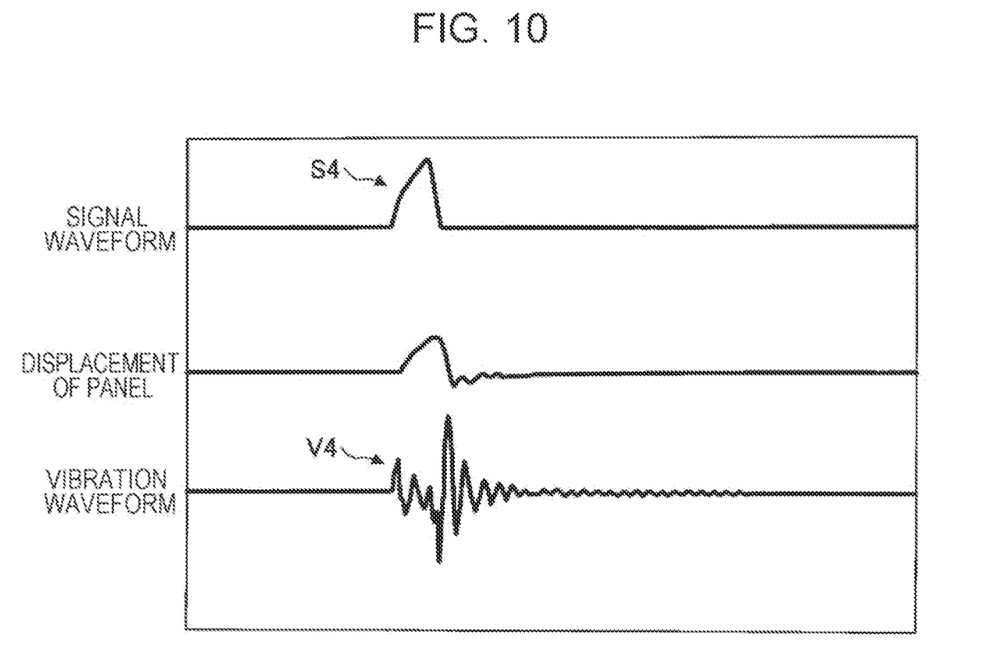
FIG. 10 is a diagram illustrating an example of the vibration waveform of an operating unit responsive to the drive signal shown in FIG. 9.

FIG. 10 is a chart showing an example the vibration waveform of the operating unit 102 in response to the drive signal S4 shown in FIG. 9. FIG. 10 illustrates the vibration waveform of the operating unit 102 when the actuator 106 is driven in response to the drive signal S4 shown in FIG. 9 together with the waveform of the drive signal S4 and the amount of displacement of the operation panel (operating unit 102). As shown in FIG. 10, when the actuator 106 was driven in response to the drive signal S4 shown in FIG. 9, the vibration waveform V4 of the operating unit 102 first reaches a first vibration peak at the start of the rising interval P8 (during the steep voltage rise), next reaches a weak vibration peak in the remaining interval of the rising interval P8 (during the gradual voltage rise), and then reaches a maximum vibration peak at the end of the falling interval P9 (during the steep voltage drop). In other words, producing the weak vibration peak between the first vibration peak and the maximum vibration peak in response to the drive signal S4 causes a time lag in tactile feeling to give the user a movable frictional feeling, thereby generating a stroke feeling. This allowed the input apparatus 100 according to an embodiment to present a stroke operation feeling to the operator. In particular, in this example, a subject sensitivity test showed that setting the period of the waveform of the drive signal S4 to 7 to 21 ms enabled a tactile feeling and a stroke operation feeling to be reliably presented to the operator. The sensitivity test also showed that when the period of the waveform of the drive signal S4 was less than 7 ms, a tactile feeling could be perceived by the operator, whereas stroke operation feeling could not be perceived by the operator. This sensitivity test also showed that when the period of the waveform of the drive signal S4 was longer than or equal to 21 ms, a two-step tactile feeling was perceived by the operator.

Example of Drive Signal and Vibration Waveform According to Embodiment (Example 5)

Figure 11:
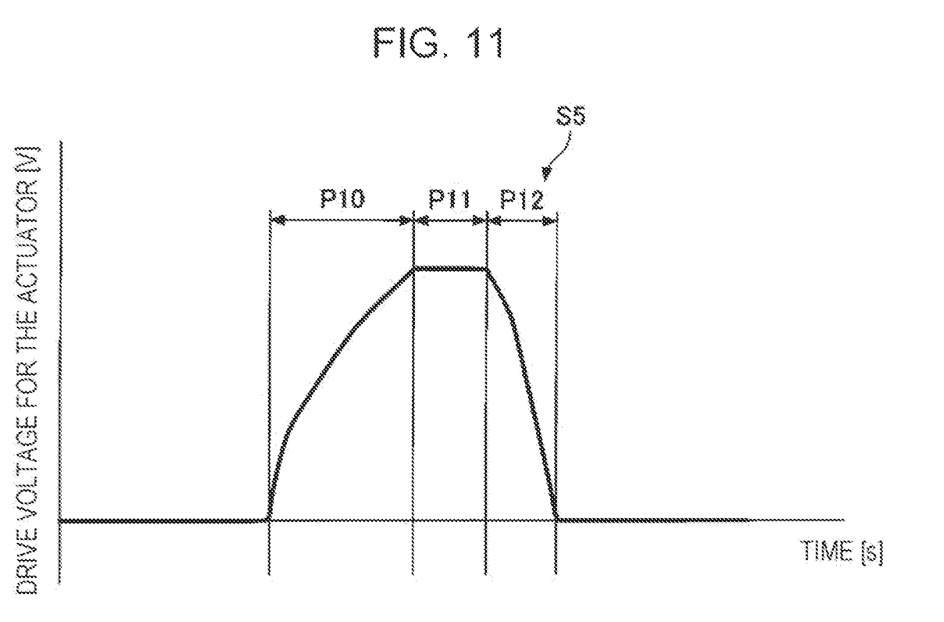
FIG. 11 is a diagram illustrating the waveform of a drive signal according to an embodiment.

FIG. 11 is a diagram illustrating the waveform of a drive signal S5 according to an embodiment. The drive signal S5 shown in FIG. 11 is Example 5 of the drive signal supplied from the control unit 108 to the actuator 106 in the input apparatus 100 according to an embodiment. As shown in FIG. 11, the waveform of the drive signal S5 is a modification of the waveform of the drive signal S4 shown in FIG. 9 and has a constant period P11 with a constant peak voltage between a rising interval P10 and a falling interval P12.

When the actuator 106 was driven in response to the drive signal S5 shown in FIG. 11, a stroke operation feeling could be presented to the operator as when the actuator 106 was driven in response to the drive signal S4 shown in FIG. 9. In particular, when the actuator 106 was driven in response to the drive signal S5 shown in FIG. 11, the rising interval P10 was shorter than that when the actuator 106 was driven in response to the drive signal S4 shown in FIG. 9, and the presence of the constant period P11 with a constant peak voltage increased the exciting force generated by the actuator 106 to increase the vibration and displacement propagated to the operating unit 102, allowing presenting a stroke operation feeling to the operator more reliably.

Having described an embodiment of the present invention in detail, it is to be understood that the present invention is not limited to the embodiment and that various modifications and changes may be made within the scope of the gist of the present invention.

For example, in an embodiment, the waveform of each drive signal is based on a triangular wave. This is given for mere illustrative purposes. The waveform of each drive signal may be based on a sine wave. In this case also, providing the waveform of each drive signal (sine wave) with the characteristic points similar to those of the waveform of each drive signal (triangular wave) described in the embodiment provides the same advantageous effects as those of the waveform of each drive signal (triangular wave).

What is claimed is:

1. An input apparatus comprising:
   an operating unit on which an input operation is performed by touching the operation unit by an operator;
   a detecting unit configured to detect the input operation performed on the operating unit;
   an actuator configured to impart vibration to the operating unit, the actuator being driven by a drive signal to impart the vibration, the actuator including a piezoelectric element; and
   a control unit configured to supply the drive signal to the actuator according to a result of detection performed by the detecting unit,
   wherein the drive signal includes a triangular wave or a sine wave, and a signal waveform of the drive signal has a state in which a rising interval and a falling interval are asymmetric about a peak voltage of the signal waveform,
   the falling interval of the signal waveform of the drive signal is longer than the rising interval of the signal waveform of the drive signal,
   the rising interval is from a first position having an initial voltage from which the signal waveform rises to the peak voltage, and the falling interval is from the peak voltage to a second position at which the signal waveform reaches the initial voltage,
   the signal waveform of the drive signal reaches to a negative voltage during the falling interval, and the signal waveform of the drive signal has a return interval from a peak of the negative voltage in the falling interval to the initial voltage, and
   the return interval has a lower voltage fluctuation rate than the falling interval.

2. The input apparatus according to claim 1 wherein the return interval is longer than a period in which residual vibration, which depends on a natural vibration frequency of the operating unit, is converged.

3. The input apparatus according to claim 1, wherein the control unit controls an amount of residual vibration, which depends on a natural vibration frequency of the operating unit, by supplying the drive signal having the asymmetric signal waveform to the actuator.

4. The input apparatus according to claim 1, wherein each of the falling interval and return interval has a straight-line segment as the signal waveform.

5. The input apparatus according to claim 4, wherein the return interval is longer than a period in which residual vibration, which depends on a natural vibration frequency of the operating unit, is converged.

6. An input apparatus comprising:
   an operating unit on which an input operation is performed by touching the operation unit by an operator;
   a detecting unit configured to detect the input operation performed on the operating unit;
   an actuator configured to impart vibration to the operating unit, the actuator being driven by a drive signal to impart the vibration; and
   a control unit configured to supply the drive signal to the actuator according to a result of detection performed by the detecting unit,
   wherein the drive signal includes a triangular wave or a sine wave, and a signal waveform of the drive signal has a state in which a rising interval and a falling interval are asymmetric about a peak voltage of the signal waveform,
   the falling interval of the signal waveform of the drive signal is shorter than the rising interval of the signal waveform of the drive signal,
   the rising interval is from a first position having an initial voltage from which the signal waveform rises to the peak voltage, and the falling interval is from the peak voltage to a second position at which the signal waveform reaches the initial voltage,
   the signal waveform of the drive signal changes in such a manner that a voltage rises steeply and then gradually in the rising interval, and
   the signal waveform of the drive signal has a period of 7 to 21 msec.

7. The input apparatus according to claim 6 wherein the natural vibration frequency is lower than or equal to 1 kHz.

8. The input apparatus according to claim 6, wherein the signal waveform of the drive signal has a constant interval having a constant peak voltage between the rising interval and the falling interval.

* * * * *